INVENTOR.
DAVID P. HASS
BY Woodhams, Blanchard & Flynn
ATTORNEYS

United States Patent Office 3,546,879
Patented Dec. 15, 1970

3,546,879
TWO-SHAFT TURBINE WITH MEANS FOR CONTROLLING RELATIVE SHAFT ROTATION
David P. Hass, Detroit, Mich., assignor to Eaton Yale & Towne Inc., Cleveland, Ohio, a corporation of Ohio
Filed Aug. 19, 1968, Ser. No. 753,624
Int. Cl. F02c *3/06*
U.S. Cl. 60—39.16                                18 Claims

ABSTRACT OF THE DISCLOSURE

A power system utilizing a gas turbine engine having combustion apparatus, a free turbine and first and second relatively rotatable shafts, the first shaft being connected for rotation with the combustion apparatus and the second shaft being connected for rotation with the free turbine wherein a fluid coupling is provided between the first and second shafts for relating the relative speeds of rotation of the shafts. The load is selectively connectible to the second shaft.

FIELD OF THE INVENTION

This invention relates to a power system, as for supplying the motive power to vehicles, and, more particularly, relates to a gas turbine engine of the free turbine type having a pair of relatively rotatable shafts therein, said shafts being coupled together by a fluid torque transfer device for relating the relative speeds of rotation of the shafts.

BACKGROUND OF THE INVENTION

The use of turbine engines in land vehicles, such as automobiles and trucks, though subjected to intensive development effort, has been hindered by many problems which remain unsolved.

Those skilled in the art of turbine power sources are aware that such turbines comprise a rotary turbine element such as the compressor rotor carrying one or more rows of turbine blades thereon which have a substantial mechanical inertia. For this and other well-known reasons, such turbines are best designed to operate at a substantially constant speed which is also usually a high speed. Thus turbine engines usually have a sluggish response to demands for either acceleration or deceleration and this is not compatible with good automotive performance.

Another of these problems appears in the association of the engine with effective transmission means for providing suitable speed ratios between the turbine output and the drive wheels of the vehicle. Particularly, in those applications where a spur gear-type transmission has for reasons of efficiency been used with the turbine, it introduces the problem of turbine runaway when the transmission is in neutral. This problem is serious enough in itself but it also complicates the synchronizing of the ratio gears during a shifting operation. U.S. application Ser. No. 669,046, filed on Sept. 20, 1967, now Pat. No. 3,476,225, assigned to the same assignee as the present invention, discloses one way in which the turbine is prevented from running away, that is, said application discloses the connecting of a braking device to the output of the turbine engine between the engine and the clutch and transmission.

As those familiar with the construction of the three turbine power engines are aware, the rotational speed of the free power turbine is not usually the same as the rotational speed of the compressor, although in optimum operation, the speeds approach one another. However, when the relative rotational speeds of the two shafts are widely different the fuel consumption is high which has made it difficult to enhance the use of turbine engines.

Known devices which have attempted to relate the rotational speeds of the two shafts in order to improve the efficiency thereof, such as friction clutches, have developed excessive heat which is detrimental to the performance of the apparatus, have taken up considerable space and are of an exceedingly heavy construction. In automotive practice the engine and transmission space requirements must be minimized so that maximum room can be provided in the automobile for payload, either occupants or freight. Known devices have proven to be too large and not completely satisfactory.

Furthermore, known devices which serve the purpose of relating the rotational speeds of the two shafts undergo an excessive amount of wear and the frequency of replacement of the component parts is quite high.

Accordingly, the objects of the invention include:

(1) To provide a turbine engine, as aforesaid, wherein accurate control is maintained over the relative rotational speeds between the two shafts of the turbine engine.

(2) To provide a turbine engine of the two-shaft type, wherein a partial load is applied to the output of the turbine engine so that the relative rotational speeds of the two shafts in the turbine engine are more closely related to improve the optimum operation thereof.

(3) To provide a turbine engine, as aforesaid, for cooperation with a spur gear-type transmission wherein shifts can be made quickly and easily and without subjecting the engine, or any part thereof, to the possibility of a dangerous speed increase during the shifting operation.

(4) To provide a power system which will be of sufficient structural simplicity as to be economically acceptable from a manufacturing standpoint and from the standpoint of effective maintenance.

(5) To provide a power system, as aforesaid, which is sturdy and reliable and requires a minimum of maintenance.

(6) To provide a power system, as aforesaid, wherein no appreciable amount of destructive heat is generated by the components.

Other objects and purposes of the invention will be apparent to persons acquainted with apparatus of this general type upon reading the following specification and inspecting the accompanying drawing, in which.

Figure 1:
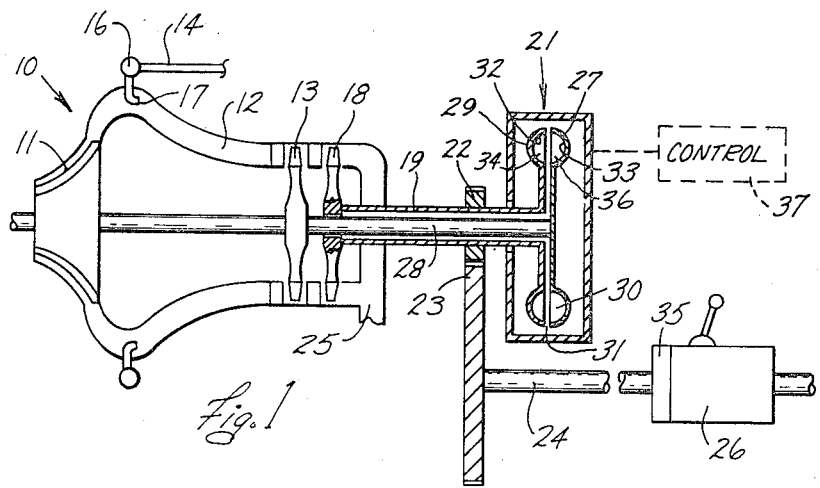
FIG. 1 is a schematic illustration of a power system embodying the invention.
Figure 2:
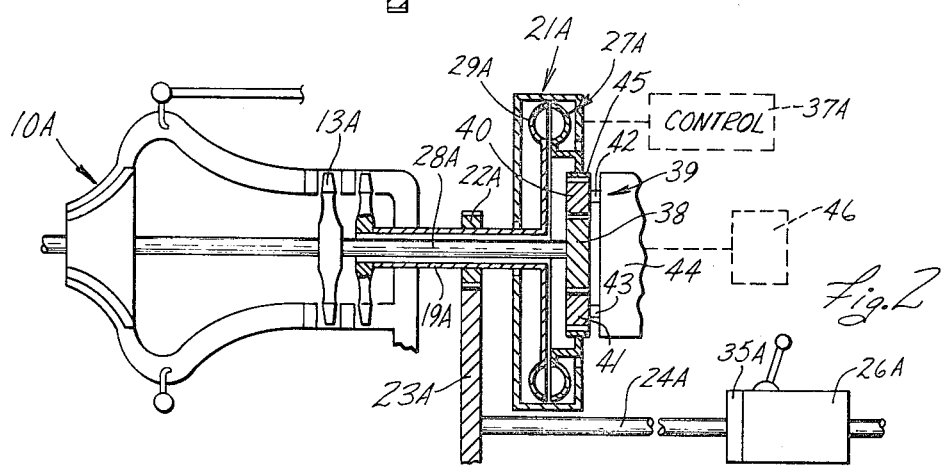
FIG. 2 is a modified power system.

Certain terminology will be used in the following description for convenience in reference only and will not be limiting. The words "up," "down," "right" and "left" will designate directions in the drawings to which reference is made. The words "front" and "rear" will refer to directions to the left and to the right, respectively, of the power system illustrated in FIG. 1, the front of the turbine engine being on the left side of the drawing. The words "in" and "out" will refer to directions toward and away from, respectively, the geometric center of the device and designated parts thereof. Said terminology will include the words above specifically mentioned, derivatives thereof and words of similar import.

SUMMARY OF THE INVENTION

The objects and purposes of the invention are met by providing a fluid torque transfer device between the relatively rotatable shafts of a two-shaft gas turbine engine for mechanically relating the relative speeds of rotation of the two shafts.

DETAILED DESCRIPTION

Referring first to FIG. 1, the turbine engine 10 comprises a compressor apparatus 11, combustion apparatus 12 and a turbine 13. The combustion apparatus 12 comprises a fuel pump (not shown) which delivers fuel to a line 14, manifold 16 and nozzles, of which one is indicated at 17. The fuel control may be of any suitable type, the details of which are immaterial to this invention.

The motive fluid or driving gas discharged from the combustion apparatus 12 flows through the turbine 13 to drive the compressor in a conventional manner and thence to a power turbine 18 to drive the hollow output shaft 19. A gear 22 is secured to the hollow output shaft 19 and drives another gear 23 and a shaft 24 which may be connected in any suitable manner to the input of a clutch 35 and transmission 26. The gas exhausted from the power turbine is discharged through a duct 25. A shaft 28 is connected to, and rotates with, the compressor turbine 13 and extends through the hollow shaft 19.

In this particular embodiment, the fluid torque transfer device 21 is connected between the shafts 19 and 28 and comprises a turbine-type fluid coupling which includes a first bladed member 27 which is connected to the shaft 28 and a second bladed member 29 connected to, and for rotation with, the output shaft 19. The second bladed member 29 is spaced slightly axially forwardly of the first member 27 to define a pressure creating zone 30 and a discharge gap 31 therebetween.

The pressure creating zone 30 is defined by a pair of oppositely facing annular troughs 32 and 33 of semicircular cross section. Each trough 32 and 33 has a plurality of circumferentially spaced blades 34 and 36, respectively, oriented as desired, such as disclosed in Pat. No. 3,291,268 and assigned to the same assignee of the present invention.

A control mechanism 37 (indicated in dotted lines) may be associated with the fluid torque transfer device to regulate in any conventional manner manually, automatically, or both, the degree of coupling between the first bladed member 27 and the second bladed member 29, such as by regulating the extent to which the device 21 is filled with hydraulic fluid. Alternatively, any other conventional means for controlling such coupling, such as the spacing between the parts 27 and 29, may be used and made responsive to the control 37.

OPERATION

The operation of the device will be readily apparent to those skilled in the art. However, the operation of the device will be described in detail hereinbelow for a better understanding of the invention.

When the transmission 26 is in neutral so that there is no appreciable load on the output shaft 19 of the engine 10, the fluid torque transfer device 21 can be appropriately controlled by the control mechanism 37 to prevent the free turbine 18 from attaining an excessive and potentially destructive speed. Furthermore, the control mechanism 37 can be appropriately regulated to more closely relate the rotational speeds of the shaft 28 and output shaft 19 of the turbine engine and thereby to utilize the relatively constant rate of the compressor turbine for accelerating or decelerating the power turbine as needed to effect or assist a shift sequence in the transmission.

More particularly, assuming, for example, that a downshift has occurred in the transmission 26 and that the road wheels of the vehicle continue at a substantially constant speed, the shaft 24 will increase in speed upon an engagement of the clutch 35 and the increased speed will be transmitted through the gears 23 and 22 to the output shaft 19 to increase the speed of rotation of the power turbine 18. Furthermore, the increased speed can, if desired, also transmit through the torque transfer device 21 to drivingly increase the speed of rotation of the compressor turbine. The driving of the compressor turbine will assist or aid the engine and improve the responsiveness of the engine to applications of fuel to the combustion apparatus to help accelerate the compressor turbine at the completion of the downshift to the speed determined by the rate of fuel input.

Next assuming, for example, that an upshift has occurred in the transmission 26 and that the speed of the road wheels remains relatively constant, the shaft 24 will decrease in speed upon an engagement of the clutch 35 and the decreased speed will be transmitted through the gears 23 and 22 to the output shaft 19 to decrease the speed of rotation of the power turbine 18. The decrease in speed of the shaft 19 will be transmitted through the torque transfer device 21 to the shaft 28 to assist the engine in decelerating the compressor rotor to the level determined by the rate of fuel input.

Thus, the inertia of the vehicle used for both upshifts and downshifts for modifying the speed of both shafts of the engine and securing thereby more rapid response by the engine to a shifting operation.

MODIFIED EMBODIMENT OF FIG. 2

The turbine engine 10A is identical to the engine 10 illustrated in FIG. 1. Hence, for purposes of discussion, the component parts of the modified embodiment will be referred to by the same reference numerals designating corresponding parts of the embodiment illustrated in FIG. 1 but with the suffix A added thereto and detailed description thereof will not be repeated.

In this particular embodiment, the shaft 28A, which is secured to the turbine 13A and rotatable therewith, is connected to the sun gear 38 of a planetary gear system 39 and is rotatable therewith. A plurality of planet gears 40 and 41 are rotatably supported on shafts 42 and 43, respectively, which shafts are connected to a frame member 44. In this particular embodiment, the bladed member 27A of the fluid torque transfer device 21A is connected to a ring gear 45 which is in meshing engagement with the planet gears 39 and 40.

In operation, the planetary gear system 39 provides a ratio between the shafts 19A and 28A when the fluid torque transfer device 21A is fully energized by the control mechanism 37A. The planetary gear system 39 also aids the fluid torque transfer device 21A to maintain a selective relative speed of rotation between the shafts 19A and 28A.

If desired, an auxiliary control 46 can be connected in association with the frame member 43 to rotate same in either rotative direction about an axis coaxial with the axis of the shaft 28A. Thus, a variable gear ratio is provided between the shafts 19A and 28A. Furthermore, the provision of the planetary gear system provides a greater back load from the turbine output shaft 19A and the shaft 28A.

MODIFIED EMBODIMENT OF FIG. 3

Figure 3:
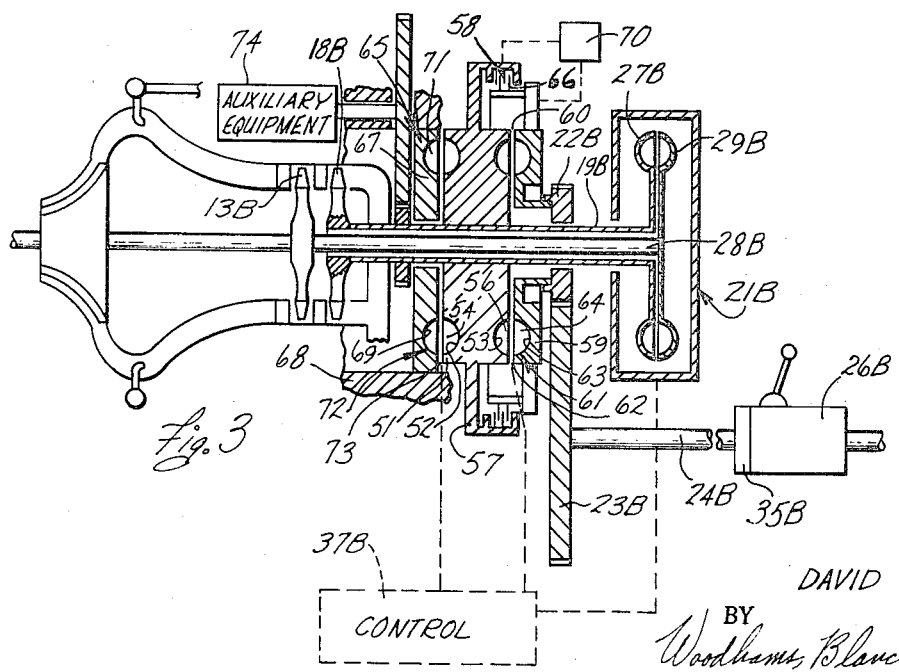
FIG. 3 is another modified power system.

The turbine engine 10B illustrated in FIG. 3 is identical to the engine illustrated in FIG. 1. Hence, for purposes of discussion, the component parts of this modified embodiment will be referred to by the same reference numerals designating corresponding parts of the embodiment of FIG. 1 but with the suffix B added thereto and no detailed description thereof is needed.

In this particular embodiment, the fluid torque transfer device 21B is identical to the fluid torque transfer device illustrated in FIG. 1 and no further detailed description thereof is necessary.

In this embodiment, however, a rotor 51 is secured to the output shaft 19B and is rotatable therewith. The rotor 51 has a pair of oppositely facing annular troughs 52 and 53 of semicircular cross section. Each trough 52 and 53 has a plurality of circumferentially spaced blades 54 and 56, respectively, oriented as disclosed in the aforesaid Pat. No. 3,291,268.

The rotor 51 has an extension 57 extending radially outwardly from the outer surface thereof and comprises a plurality of clutch plates adjacent the outermost edge thereof. An output member 59 is spaced slightly axially rearwardly of the rotor 51 to define a fluid coupling 60 having a fluid discarge gap 62 between the rotor 51 and the output member 59. The output member 59 has an annular trough 63 of semicircular cross section and is aligned with the annular trough 53 in the rotor 51 so that the toroid defined by the semicircular troughs 53 and 63 will define the pressure creating zone 61. Furthermore, the annular trough 63 is provided with a plurality of circumferentially spaced blades 64 oriented as described above. The output member 59 is secured in any convenient manner to a gear 22B so that the gear is rotatable therewith. In this particular embodiment, the gear 22B drives another gear 23B and a shaft 24B which may be connected in any suitable manner to the input of a transmission 26B.

A clutch 58 comprising a plurality of clutch and separator plates 66 is secured between the output member 59 and the rotor 51. In this particular embodiment, the clutch 58 is speed responsive and may, if desired, be controlled by a control device 70 of any conventional type so that the clutch and separator plates 66 will become automatically engaged upon the attainment of a predetermined differential in speed between the output member 59 and the rotor 51. However, other controls, automatic or manual, for the clutch 58 may be used as desired.

A brake or retarder mechanism 65 comprises a brake member 67 secured to a stationary frame structure 68. The brake member 67 has an annular trough 69 therein in radial alignment with the annular trough 52 and the rotor 51. A plurality of circumferentially spaced blades 71 are oriented in the trough 69 in a manner described above. The spacing between the brake member 67 and the rotor 51 defines a discharge gap 73 therebetween. The troughs 52 and 69 define a pressure creating zone 72.

The control mechanism 37B (indicated in dotted lines) is associated with each of the fluid torque transfer device 21B, the fluid coupling 60 and the brake mechanism 65 to regulate the degree of coupling therebetween. As with control mechanism 37, the control mechanism 37B may in any conventional manner be controlled manually, automatically or both.

In operation, the fluid torque transfer device 21B functions in the same manner as disclosed above with respect to FIG. 1. That is, the fluid torque transfer device 21B serves the same purpose of relating the relative rotational speeds of the shaft 28B and the output shaft 19B of the turbine engine 10B.

The fluid coupling 60 serves to regulate the power applied to the gear 22B and, in this particular embodiment, to the transmission 26B. More particularly, the power on the output shaft 19B will be transmitted through the fluid medium in the annular troughs 53 and 63 to cause a driving of the gear 22B. If for example, the vehicle is standing still, and it is desired to accelerate from the standing position, the control 37B and the fluid coupling 60 can be utilized to control the rate of power transfer from the output shaft 19B to the gear 22B to soften the start of the vehicle. When the speed of rotation of the gear 22B has reached a predetermined speed, the clutch plates 66, which are made responsive to the relative speed between rotor 51 and output member 59 by the device 70, will move into engagement with the clutch plates 58 on the rotor 51 to create a locking engagement between the rotor 51 and the output member 59. Since the speed of rotation between the rotor 51 and the output member 59 are approximately equal when the engagement occurs, there will be no jerk felt by the operator of the vehicle.

If, for example, the load were removed from the output shaft 19B and gear 22B, there would be a tendency for the output shaft 19B to accelerate at a dangerous rate. However, the fluid torque transfer device 21B and the braking mechanism 65 will function to hinder, and/or limit, the acceleration of the output shaft 19B. More particularly, the braking mechanism 65 will transfer torque through the fluid medium in the annular troughs 52 and 69 so that energy will be absorbed by the brake member 67 to apply a retarding force onto the rotor 51.

Since the usual turbine engine has slow acceleration and deceleration characteristics and a very poor response to load variations and demands which are reflected in the speed and direction of rotation of the output shaft, the brake mechanism, in addition to the more prevention of turbine runaway, can be utilized to aid the engine in acquiring a faster response to varying load demands. That is, the control 37B can be regulated so that the braking mechanism would be operative to retard the rotation of the rotor 51. Furthermore, the engine 10B can be controlled so that a high torque output is achieved on the output shaft 19B simultaneous with the retarding action. By releasing the retarding action on the rotor 51, the rotor 51 will be permitted to accelerate as a function of the rate in which the retarding action is released. Thus, for example, if a fast start is desired, the engine can be regulated to a high torque output while the rotor 51 is being retarded and by a quick release of the retarding action on the rotor 51, all of the torque of the engine 10B would be applied through the fluid medium between the rotor 51 and the output member 59 to apply a very high torque to the transmission 26B and the vehicle wheels.

Furthermore, the brake mechanism 65 can be utilized to retard the rotor 51 when the transmission is in neutral. Thus, auxiliary equipment 74 can be run off the output shaft 19B even when the transmission is in neutral.

The invention has for simplicity of illustration been shown with the engine connected directly to the fluid coupling and this arrangement is desirable for a high speed (as 30,000 r.p.m.) engine in order to enable the coupling to be of very small diameter. However, wherever it is desirable to have the coupling run at any speed, faster or slower, than that of the engine, it will of course be possible to gear same up or down as necessary, or otherwise provide in any conventional manner for a suitable ratio relationship between the speed of the engine and that of the coupling.

Similarly the two sides of the fluid coupling are for simplicity shown as mounted directly on the engine shafts. It will be obvious in view of the foregoing that either or both of them may be indirectly connected to the engine shafts in any manner to maintain a selected speed ratio between the respective sides of the coupling and the shafts of the engine respectively connected therewith. For example, the left side of the coupling may be driven from the shaft 24.

The embodiments of the invention in which an exclusive property or privilege is claimed are defined as follows:

1. A power system comprising in combination:
   a gas turbine engine having combustion aparatus, a compressor, a free turbine and first and second relatively rotatable coaxial shafts, said first shaft being coaxial and connected for rotation with said compressor and said second shaft being coaxial and connected for rotation with said free turbine;
   first fluid torque transfer means coaxially aligned with and connected between said first and second shafts for relating the relative speeds of rotation of said shafts; and
   load means connectible to said second shaft.

2. The power system of claim 1 including frame means supporting said engine and braking means interposed between said second shaft and said frame means for limiting the speed of rotation of said second shaft, said braking means including second fluid torque transfer means having an input member connected to said second shaft and an output member connected to said frame means.

3. The power system defined in claim 1, including a planetary gear system coupling one of said shafts to one side of said first fluid torque transfer means and including further means coupling the other side of said first fluid torque transfer means to the other of said shafts.

4. The power system defined in claim 3, including means for varying the gear ratio of said planetary gear system between said one shaft and said first fluid torque transfer means.

5. The device defined in claim 1, including also means adjustably varying the magnitude of the driving relationship between the rotors of said first fluid torque transfer means.

6. The power system defined in claim 1, in which the first fluid torque transfer means includes a turbine-type torque transfer coupling having a first bladed rotor fixedly connected to one of said shafts for rotation therewith and a second bladed rotor drivingly interconnected to the other of said shafts for rotation therewith.

7. The power system defined in claim 1, in which the first fluid torque transfer means includes first and second rotor members interconnected for rotation with the first and second shafts, respectively, the first and second rotor members being positioned closely adjacent to but spaced from one another, and a fluid medium disposed in the space between said first and second rotor members for transmitting torque therebetween.

8. The power system defined in claim 1, wherein said second shaft is elongated and hollow and telescopes said first shaft, and said first fluid torque transfer means is located at adjacent ends of said first and second shafts.

9. A power system comprising in combination:
a gas turbine engine having combustion apparatus, a compressor, a free turbine and first and second relatively rotatable shafts, said first shaft being connected for rotation with said compressor and said second shaft being connected for rotation with said free turbine;
first fluid torque transfer means connected between said first and second shafts for relating the relative speeds of rotation of said shafts;
frame means supporting said engine and braking means interposed between said second shaft and said frame means for limiting the speed of rotation of said second shaft;
said braking means including second fluid torque transfer means, said second fluid torque transfer means having an input member connected to said second shaft and an output member connected to said frame means;
load means connectible to said second shaft and a power-transmitting member drivingly engaging said load means, said power-transmitting member being relatively rotatable with respect to said second shaft; and
third fluid torque transfer means drivingly relating said power transmitting member to said second shaft.

10. The power system defined in claim 9, including means positively connecting said second shaft to said power transmitting member.

11. The power system defined in claim 9, including friction clutch means connected in parallel with said third fluid torque transfer means whereby said friction clutch makes possible a positive coupling between said second shaft and said power transmitting member.

12. The power system defined in claim 11, including means whereby said friction clutch means is manually engageable.

13. The power system defined in claim 11, including means whereby said friction clutch means is automatically engageable at a predetermined speed.

14. In combination, a power system including a gas turbine engine having a compressor and a free turbine, a first shaft connected for rotation with said compressor and a second shaft connected for rotation with said free turbine, a shiftable gear transmission and torque-transmitting means drivingly connecting said second shaft to said transmission, said torque-transmitting means including clutch means for permitting shifting of said transmission, the improvement comprising fluid torque transfer means drivingly interconnecting said first and second shafts for controlling the relative rotational speeds of said first and second shafts, said fluid torque transmitting means including a torque transmitting fluid medium.

15. The combination according to claim 14, wherein said fluid transfer means includes a turbine-type fluid coupling.

16. The combination according to claim 15, wherein said turbine-type fluid coupling includes first and second bladed rotors positioned axially adjacent but spaced from one another, each bladed rotor having an annular trough containing a plurality of circumferentially spaced blades, and said fluid medium being disposed in the axial space between said first and second bladed rotors for permitting transfer of torque therebetween.

17. The combination according to claim 14, wherein said first and second shafts are coaxial and have portions telescoped one within the other, and said fluid torque transfer means being coaxial with and drivingly connected between the telescoped portions of said first and second shafts.

18. A power system comprising in combination:
a gas turbine engine having combustion apparatus, a compressor, a free turbine and first and second relatively rotatable coaxial shafts, said first shaft being fixedly connected for rotation with said compressor and said second shaft being fixedly connected for rotation with said free turbine;
fluid torque transfer means interconnected between said first and second shafts for relating the relative speeds of rotation of said shafts;
said fluid torque transfer means including a first rotor drivingly interconnected to said first shaft for rotation therewith and a second rotor drivingly interconnected with said second shaft for rotation therewith, said first and second rotors being positioned closely adjacent but slightly spaced from one another;
said fluid torque transfer means further including a fluid medium disposed in the space between said first and second rotors with said fluid medium constituting the sole means for transmitting torque directly between said first and second rotors; and
load means connectible to said second shaft and drivable from said engine through said fluid torque transfer means.

References Cited
UNITED STATES PATENTS

| | | | |
|---|---|---|---|
| 1,764,849 | 6/1930 | O'Connor | 192—58A3 |
| 3,138,923 | 6/1964 | Kronogard | 60—39.16X |
| 3,234,902 | 2/1966 | Booth | 60—39.16X |
| 3,237,404 | 3/1966 | Flanigan et al. | 60—39.16 |
| 3,266,248 | 8/1966 | Leslie | 60—39.16 |
| 3,291,268 | 12/1966 | Nagel | 192—4B |
| 3,386,242 | 6/1968 | Trapp | 60—39.16 |
| 3,038,307 | 6/1962 | Oprecht | 60—39.16 |

CARLTON R. CROYLE, Primary Examiner

U.S. Cl. X.R.
60—102; 192—58